United States Patent [19]
Wasserman et al.

[11] Patent Number: 5,155,795
[45] Date of Patent: Oct. 13, 1992

[54] HERMETIC OPTICAL FIBER FEEDTHROUGH ARRANGEMENT

[75] Inventors: Alexander Wasserman, West Hills; Leslie Kerek, Los Angeles, both of Calif.

[73] Assignee: G&H Technology, Inc., Camarillo, Calif.

[21] Appl. No.: 763,960

[22] Filed: Sep. 23, 1991

[51] Int. Cl.⁵ .................................................. G02B 6/00
[52] U.S. Cl. .................................................... 385/138
[58] Field of Search ................................ 385/138, 139

[56] References Cited

U.S. PATENT DOCUMENTS

| | | | |
|---|---|---|---|
| 4,402,993 | 9/1983 | Aisenberg et al. | 427/38 |
| 4,473,599 | 9/1984 | Elion | 385/128 |
| 4,523,235 | 6/1985 | Rajchman | 358/473 |
| 4,530,750 | 7/1985 | Aisenberg et al. | 65/3.12 |
| 4,558,255 | 12/1985 | Genovese et al. | 385/120 |
| 4,824,455 | 4/1989 | Rand et al. | 65/3.11 |
| 4,904,052 | 2/1990 | Rand et al. | 385/128 |

*Primary Examiner*—Akm E. Ullah
*Attorney, Agent, or Firm*—George J. Netter

[57] ABSTRACT

An hermetic optical fiber feedthrough arrangement has a separable two-piece metal ferrule (10) with opposite endwall openings (18, 26) of a size slightly larger than the diameter of an optical fiber (12) which extends therethrough. Preliminarily, that part of the fiber within the ferrule cavity (16) and openings (18, 16) has a metal coating (30). The fiber is hermetically sealed within the ferrule pieces (14, 24) by a quantity of a sealant (32). The ferrule may also include an outer radial flange (22) which is hermetically secured within an opening (48) in wall, bulkhead or plate (44) by a further sealant (54).

16 Claims, 4 Drawing Sheets

HERMETIC OPTICAL FIBER FEEDTHROUGH ARRANGEMENT

BACKGROUND OF THE INVENTION

1. Field of the Invention

The present invention relates generally to a feedthrough for an optical fiber, and, more particularly, to such a feedthrough providing an hermetic seal about the optical fiber and a wall member through which it passes.

2. Description of Related Art

There are many situations in which it is desirable to pass an optical fiber cable through a wall member and secure the fiber to the wall member in such a manner that a hermetic seal is provided against the passage of fluids (e.g., air). This task is made especially difficult because of the importance in dealing with an optical fiber not to stress it or to produce micro-bending which can result in severe damage to the fiber or substantially reduce the quality of an optical signal being transmitted.

U.S. Pat. No. 4,119,363, PACKAGE FOR OPTICAL DEVICES INCLUDING OPTICAL FIBER-TO-METAL HERMETIC SEAL, by I. Camlibel, discloses an hermetic sealing technique for an optical fiber in which the fiber is located within an oversized tube 28 and secured therein by a quantity of metal solder. On cooling, the initially molten solder solidifies and squeezes against the fiber to form the desired hermetic seal.

A further hermetic sealing technique for use with a fiber optic is that disclosed in U.S. Pat. No. 4,214,809, FIBER OPTIC PENETRATOR, by Oswald R. Reh, in which a clearance passage, substantially larger than the fiber optic, is provided through a bulkhead separating two different pressure regions. A guide sleeve 19 is received within the bulkhead clearance passage which has an axial bore slightly larger than the diameter of the fiber optic received therein. Pressure plugs are provided at opposite ends of the guide sleeve which include sapphire orifice members with very small clearance for an inserted fiber optic, which clearances are sealed by using a resilient bonding agent.

Illustrative of yet another optical fiber feedthrough, U.S. Pat. No. 4,296,996 discloses inserting an optical fiber having a metal film coated thereon with an oxide outer surface through an oversized opening in an end face plate bore and filling the space between the inner wall of the hole with a thermoplastic material 3 such as polyethylene. A metal fitting 8 located on the high pressure side A will act to pressurize the thermoplastic material 3 to increase the seal between the material 3 and both the metal film 2 and the plate 4.

SUMMARY OF THE INVENTION

It is a primary aim and object of the present invention to provide an optical fiber feedthrough arrangement for mounting in a wall between two different pressured fluid media, which feedthrough arrangement includes a two-piece separable metal ferrule has endwall openings in opposite parts of the ferrule, each opening being slightly larger than the diameter of an optical fiber. The internal cavity of the ferrule is substantially larger than the diameter of the fiber and one of the ferrule parts may optionally include a radially outwardly directed mounting flange. An optical fiber to be mounted within the ferrule has the outer surface of its cladding plated (e.g., gold) and then passed through the small openings of each of the ferrule parts. Next, the fiber is secured within the one ferrule part by providing a quantity of molten glass, ceramic or other sealant within the ferrule cavity which upon hardening sets up an hermetic seal between the fiber and the internal wall surfaces of the ferrule part. The other ferrule part is preferably received onto the first ferrule part forming a unitary construction before hardening of the sealant.

As to the method of sealing the fiber within the ferrule, before joining the two ferrule parts an appropriate number of ceramic or glass beads are threaded onto the fiber between the ferrule parts. Then the parts are assembled together and fired to seal the interior of the ferrule to the fiber.

As a final step, the opposite end of the composite ferrule are faced off along with the end of the fiber included within the associate ferrule opening.

In use, one or more of the ferrules with included optical fibers are received through separate openings within a wall member with the outer surface of the ferrule parts being hermetically sealed to the wall member by a material such as that forming the sealant used within the ferrule. The outer end portions are so dimensioned as to enable receipt within an alignment tube to form a connector between the fiber within the ferrule and a further fiber terminated within a similarly shaped terminus. Alternatively, a plurality of feedthrough arrangements in a given configuration can be sealed within a corresponding opening in a wall, and interconnection established via a similar plurality of fiber termini and similar configuration mounted in a receptacle connector half. With an external flange on the ferrule outer surface the ferrule and included fiber as described can be precisely located and prealigned within a wall opening which may be essential where a plurality of such feedthrough arrangements are to be interconnected with mating termini mounted within a connector half.

A further form of ferrule consists of three hollow generally cylindrical members. Two outer members may be identical and each has a fully open end and an opposite end wall with a small opening just large enough to admit an optical fiber. The third or central member is cylindrical with both ends fully open. The two outer members are assembled onto the central member with sealing and finishing off being accomplished as in the first described embodiment.

In yet another embodiment, the external flange on the ferrule has an 0-ring on a side surface which is held against the wall dividing the different pressured environments by a nut threaded onto the ferrule at the opposite side of the wall. The ferrule also includes a concentric tip fitted onto each end of the ferrule which is faced-off to serve as the outermost end of the terminus.

DESCRIPTION OF A PREFERRED EMBODIMENT

Figure 1:
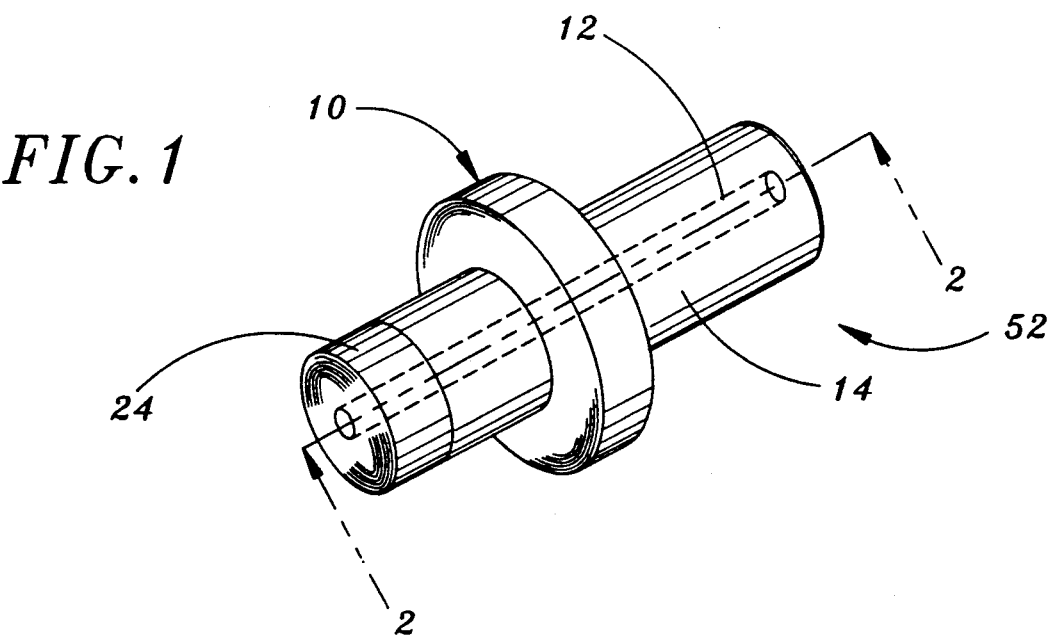
FIG. 1 is a perspective view of a ferrule of the present invention serving as an optical fiber feedthrough means.
Figure 2:
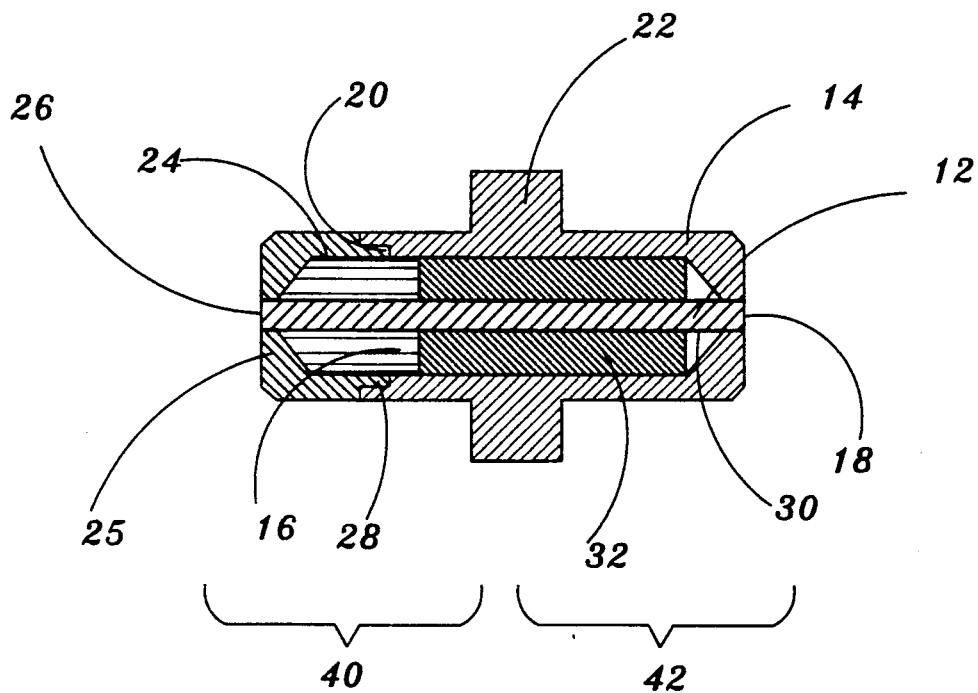
FIG. 2 is a sectional view taken along the line 2—2 of FIG. 1.

With reference now to the drawings and particularly FIGS. 1 and 2, there is shown a two-piece metal ferrule identified generally as 10 which, in a way that will be described, is assembled onto an optical fiber 12 for being hermetically sealed within an opening in a wall allowing the fiber to be interconnected through the wall while at the same time not damaging the fiber or microbending the fiber which is known to reduce the efficiency of light transmission therealong.

The ferrule 10 includes a first ferrule part 14 that is cylindrical with a hollow cylindrical cavity 16 of a diameter substantially greater than that of the optical fiber 12. In an end wall, there is formed an axial opening 18 of diameter only slightly larger than that of the optical fiber. The end opposite the opening 18 is fully open and has its outer end portion configured into a recessed cylindrical shoulder 20. A radially outwardly extending flange 22 affixed to or unitary with the ferrule part outer surface is located adjacent the open end of the first ferrule part 14.

A second ferrule part 24 is of similar cross-section dimensions as the first ferrule part and has in an end wall 25 an axial opening 26 of diameter slightly larger than that of the optical fiber while the opposite end of the ferrule part is fully open. More particularly, the open end of the ferrule part 24 is configured at 28 enabling receipt on assembly within the complementary shaped shoulder 20 of the first ferrule part. Still further, the overall length of the second ferrule part is substantially less than that of the first ferrule part and when mounted onto the first ferrule part the two axial openings 18 and 26 are in direct alignment with one another.

Figure 3:
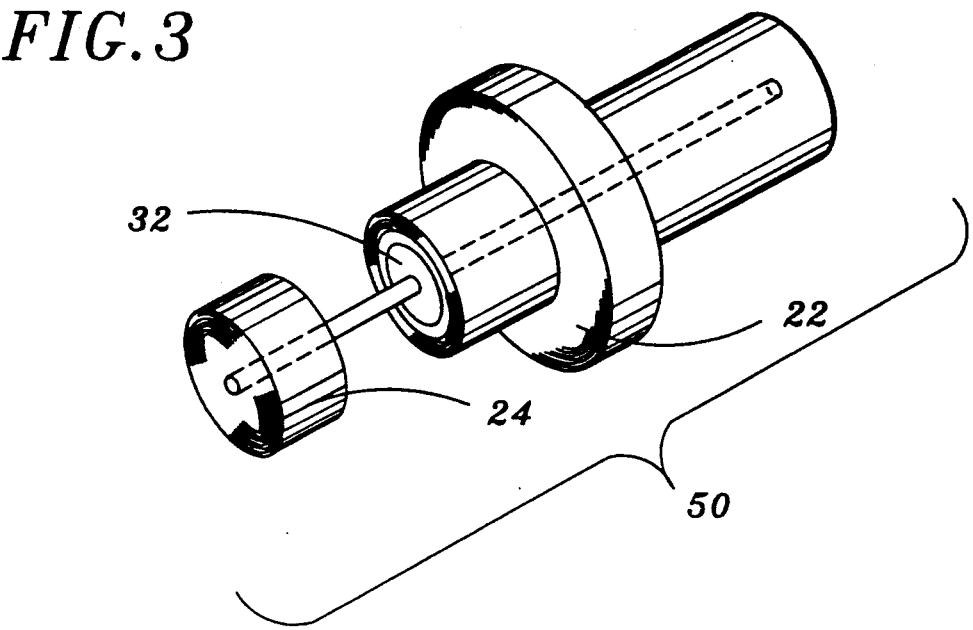
FIG. 3 is an exploded view of the ferrule and optical fiber of FIG. 1.

For the ensuing description of optical fiber assembly within the first and second ferrule parts, reference is now made to both FIGS. 2 and 3. An initial requirement is that the cladding outer surface of the optical fiber which is to be located within the ferrule must be provided with a metal coating 30, preferably gold, which, effectively, forms a metal cylinder molecularly adherent to the fiber cladding forming an hermetic seal about the fiber. The metal plated portion of the optical fiber, which should be of an extent at least as long as the cavity for the two ferrule parts when assembled extends through the central region of the two ferrule parts and extends outwardly through both axial openings 26 and 18.

The metal coating 30 may be applied by vacuum deposition, electrolytic techniques or any of several other known methods which will form a continuous coating or film about the fiber molecularly adherent to the fiber so as to form an hermetic seal between the fiber cladding and the metal coating. Although other metals or alloys of metals may be found advantageous for this purpose, best results in practical constructions of the invention have been obtained with gold. Techniques for applying the coating 30 are well known and details of such application are considered beyond the scope of this description.

A quantity of a sealant 32, such as molten glass or ceramic, is deposited into the cavity 16 at least substantially filling the cavity space between the optical fiber and the inner walls of the first and second ferrule parts. On hardening, the sealant 32 provides an hermetic seal along both the outer surface of the plating 30 on the optical fiber and, as well, along the inner wall surface of the ferrule parts.

Figure 8:
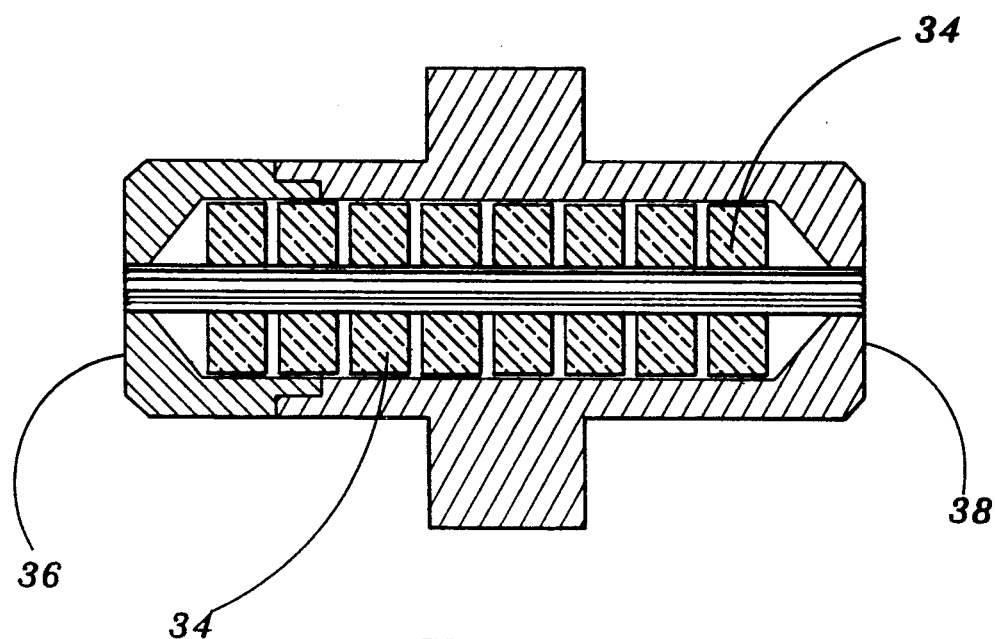
FIG. 8 depicts an interim stage in the method of hermetically sealing the optical fiber within a terminus ferrule.

A preferred method of forming the body of sealant 32 within the ferrule is depicted in FIG. 8. As shown there, a plurality of beads 34 of the sealant material are strung on the fiber and the ferrule parts 14 and 24 are assembled about the fiber and beads with the fiber ends extending through the ferrule part axial openings 18 and 26. Next, the ferrule assembly is fired to a sufficient temperature to melt the beads forming the solid mass of sealant 32 as shown in FIG. 2, for example. As already described, on hardening the sealant provides an hermetic seal to both the coating 30 and the inner wall surfaces of the ferrule parts.

The end surfaces 36 and 38 of the respective first and second ferrule parts are faced off at precisely 90 degrees to the cylindrical axis as well as the end surfaces of the fiber located within the ferrule axial openings 18 and 26. The two opposite end portions of the assembled ferrule parts, identified generally as 40 and 42, form first and second termini, respectively, for the optical fiber 12 for a purpose to be described.

Figure 4:
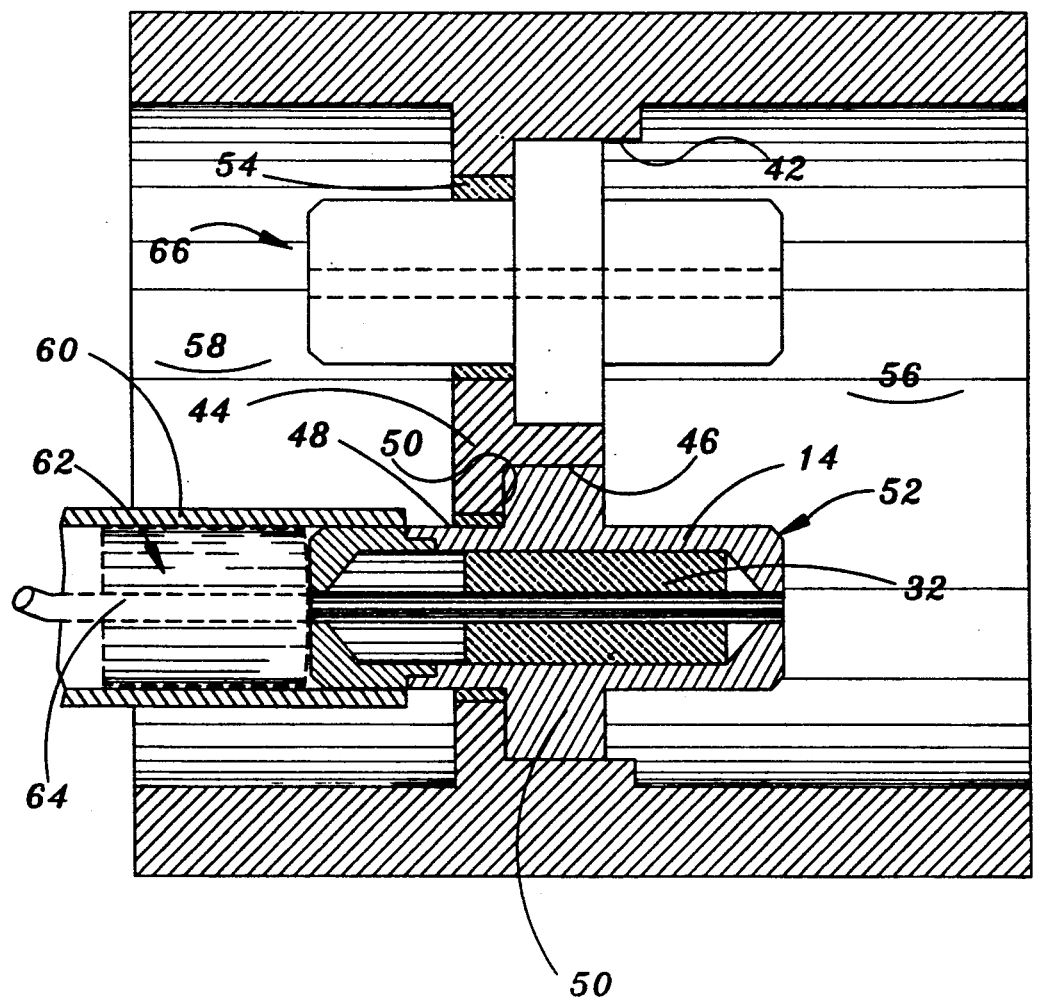
FIG. 4 is a side elevational sectional view showing a pair of feedthrough means of the present invention with included optical fibers hermetically sealed within a wall.

As can be seen best in FIG. 4, a wall 44 (e.g., bulkhead or plate) through which it is desired to pass the optical fiber and maintain a hermetically sealed relation, includes an opening 46 which is so-dimensioned as to fittingly receive the flange 22 of the first ferrule part 14 therewithin. The opening 46 continues with a smaller diameter portion 48 through the remaining thickness of the wall, with an internal shoulder 50 against which the flange can seat.

The assembled ferrule 10 with fiber sealed therein as described is received within the opening 46 and its flange 22 located within the enlarged opening portion and seated against the shoulder 50 which serves to position the completed feedthrough device consisting of ferrule with sealed in fiber, identified as 52, in an accurately prealigned manner at preferably 90 degrees to the wall 44. A quantity of a sealant 54, such as that used for the sealant 32, is then received within the space between the inner walls of the smaller diameter opening portion 48 and the outer surface of the ferrule part in continuous contact with each. On the sealant hardening, an hermetic seal is provided between the wall opening surface and the ferrule 10 such that differences of fluid pressure (e.g., air pressure) between the regions adjacent opposite sides of the wall, identified generally as 56 and 58, respectively, do not permit leakage through the wall.

Interconnection to the fiber 12 in the wall mounted device 52 can be simply accomplished by sliding one end of a hollow alignment tube 60 onto, say, the first terminus 40, and then inserting a further terminus 62 which establishes an interconnection between the feedthrough arrangement fiber 12 and the fiber 64 included within the terminus 62. Interconnection of the second terminus may be accomplished in the same manner.

Figure 9:
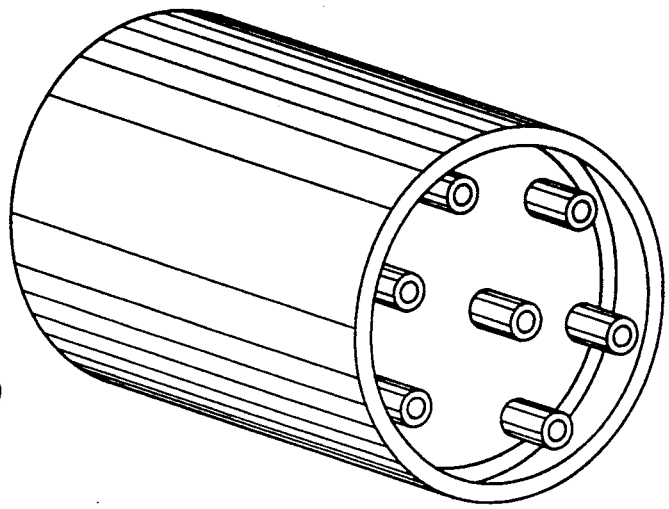
FIG. 9 is a perspective view of a connector half modified to interconnect with a plurality of feedthrough arrangements.

It is contemplated that a plurality of feedthrough devices 52 may be mounted within the wall 44 and this is represented by the device 66 shown in FIG. 4. Instead of interconnecting to each feedthrough device via a separate alignment tube and fiber terminus, a corresponding plurality of alignment tubes 67 with individual fiber termini may be unitarily assembled within a tubular connector half 68 in a configuration enabling ready interconnection to all of the feedthrough devices by merely sliding the connector half onto the feedthrough devices on one side of wall 44 (FIG. 9).

Various materials have been used for the sealant 32 and 54 in practical constructions of the described invention. However, best results to date have been obtained with the use of a ceramic.

Figure 5:
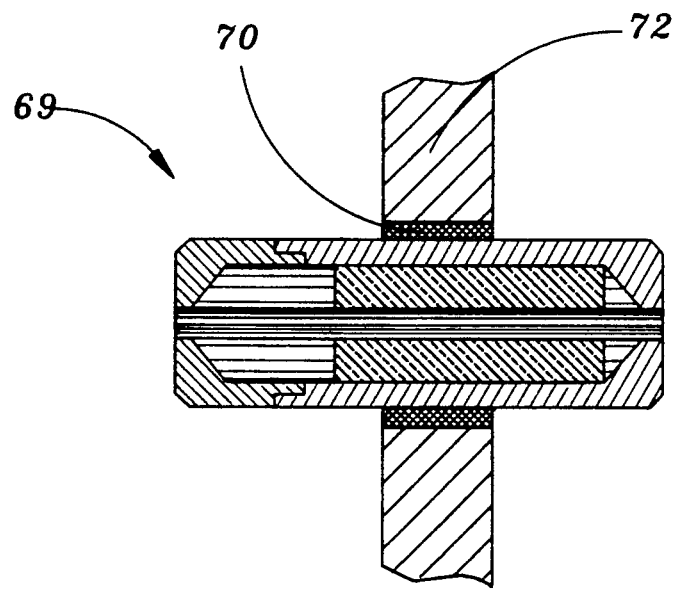
FIG. 5 is a side elevational, sectional view of a second version of the invention.

For the ensuing description of a second embodiment reference is made to FIG. 5. The feedthrough arrangement enumerated generally as 69 can be identical to the first described embodiment except that there is no external flange corresponding to the flange 22. This provides an overall cylindrical geometry to the device for receipt within an opening 70 in wall 72 which is of uniform diameter. Although this version is lighter and less expensive to construct, extra care is required where specific alignment to the wall surface is required. Otherwise, constructional details, sealant used and manner f providing sealant to the ferrule interior can be the same as in the first embodiment.

Figure 6:
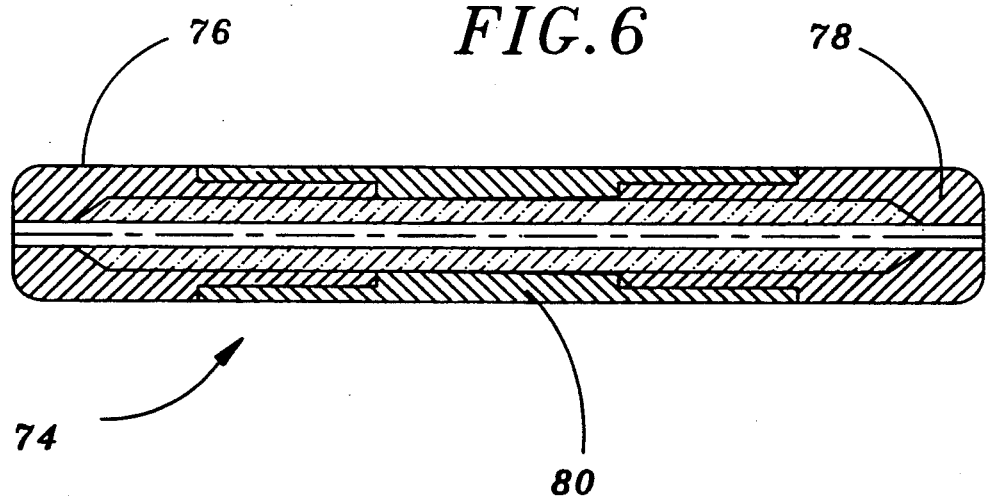
FIG. 6 is a side elevational, sectional view of a third version of the invention employing a three-piece ferrule.

In yet another, or third, embodiment, a ferrule body 74 includes three different parts which are assembled together to form a unitary construction (FIG. 6). Specifically, the ferrule body has two cylindrical end shells 76 and 78 which may be identical, each having a circular end wall with an axial opening for receipt of an optical fiber therein. The middle part 80 is an open-ended cylindrical tube which has its open ends configured to fit with complementary open ends of the end shells. Sealant used, technique of providing sealant to the ferrule body interior can be the same as those discussed previously herein. After assembly of the end shells with the central part and sealing of a fiber within, the central part is sealed within a wall opening as in the second embodiment (FIG. 5).

Figure 7:
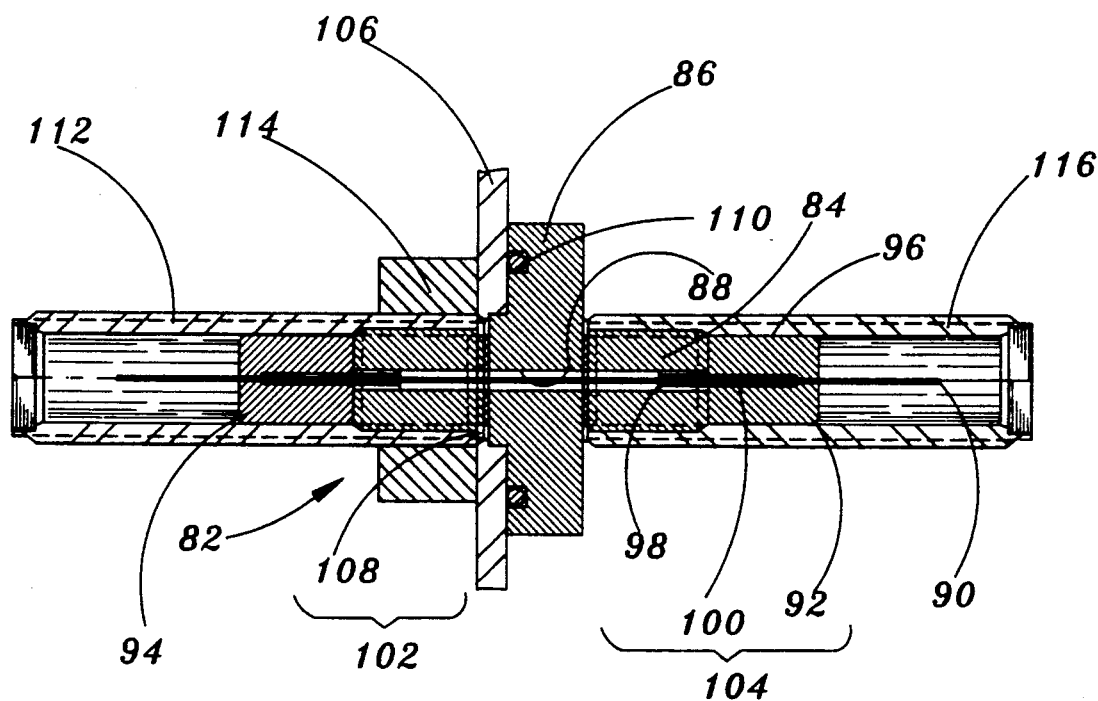
FIG. 7 is a perspective partially sectional view of a fourth version of the invention.

For still another or fourth embodiment, reference is made to FIG. 7. The feedthrough device 82 has an elongated cylindrical body 84 with a centrally located, radially outwardly extending flange 86. An axial opening 88 of a diameter substantially greater than that of an optical fiber 90 extend completely through the body 84. Two end caps 92 and 94, which can be of identical structure, each have an enlarged head portion 96 and an integral axially extending plug 98 of outer diameter enabling fitting receipt within the opening 88 of the body 84. An axial opening 100 which extends through both the head portion and plug has a diameter enabling the fiber 90 with cladding to be snugly received therein.

In assembly, the fiber 90 with a metal coating as previously described is located within the opening 88 and opening 100 with a body of sealant provided in opening 88 to hermetically seal the fiber within the cylindrical body 84. Next, the outer ends of the end caps 92 and 94 are faced off and polished as well as the fiber ends so that the fiber ends are substantially coextensive with the end cap outer faces.

The feedthrough device 82 has first and second termini 102 and 104 located on opposite sides of the flange 86. In mounting the device to a wall 106, the terminus 94 is inserted through a suitably sized opening 108 in the wall with an 0-ring 110 in a suitable recess in the flange side being pressed against the wall. An alignment tube 112 is threaded onto that portion of the body 84 included within terminus 102 which acts to compress the 0-ring 110 against the wall 106 and provide the desired hermetic seal. A lock-nut 114 threaded onto the alignment tube maintains the hermetic condition.

Interconnection to the fiber 90 in the feedthrough arrangement 82 is achieved by inserting a terminated fiber (not shown) within the alignment tube to the correct position where an optical signal can be transmitted between the fibers. Similarly, a further alignment tube 116 is threaded onto terminus 104 for enabling connection to that side of the feedthrough arrangement.

Although the present invention is described in connection with a preferred embodiment, it is to be understood that those skilled in the appertaining art may effect modifications that come within the spirit of the invention and the ambit of the claims.

What is claimed is:

1. A feedthrough arrangement for hermetically interconnecting an optical fiber through a wall member, comprising:
    first and second parts each having a continuous sidewall enclosing an internal cavity, a relatively large open end, and an opposite end wall with a relatively small opening of dimensions only slightly larger than the diameter of the optical fiber, said first and second parts having their relatively large open ends unitarily fitted together, said relatively small openings for receiving the optical fiber therethrough;
    a metal coating formed on a length of the optical fiber outer surface located within the unitarily fitted together first and second parts; and
    a quantity of a sealant in at least the first part cavity contacting both the metal coating on the optical fiber outer surface and the first part cavity wall in such manner as to hermetically seal the metal coating to the first part; each said parts having the outer surface at the endwall adjacent the relatively small opening and the ends of said fiber being faced off and polished.

2. A feedthrough arrangement as in claim 1, in which the metal coating is applied to the optical fiber cladding outer surface.

3. A feedthrough arrangement as in claim 1, in which the first and second parts are each hollow cylindrical metal ferrules with one end wall and the opposite end being open; and the relatively small openings being formed in the respective end walls and lying on the cylindrical axis when the parts are fitted together.

4. A feedthrough arrangement as in claim 3, in which end portions of the first and second parts adjacent the open ends are formed so as to enable complementary fitting of the said parts to one another.

5. A feedthrough arrangement as in claim 1, in which the sealant is ceramic.

6. A feedthrough arrangement as in claim 1, in which the sealant is glass.

7. A feedthrough arrangement as in claim 1, in which the metal coating is gold.

8. A feedthrough arrangement as in claim 1, in which the wall member includes an oversize opening within which the unitarily fitted first and second parts are located with the optical fiber having one end located on one side of the wall member and the other end on the opposite side of the wall member; a further quantity of a sealant received within the wall member opening effecting an hermetic seal of the unitarily fitted first and second parts within the wall member opening.

9. A feedthrough arrangement as in claim 8, in which the further quantity of a sealant is a ceramic.

10. A feedthrough arrangement as in claim 8, in which the first part further includes a radially outwardly extending flange on its outer peripheral surface; said wall member opening having sufficient dimensions on one side of the wall member to enable receipt of the first part flange therewithin, and an internal shoulder within the wall member opening against which the flange rests when fully seated within the wall member opening.

11. A device for hermetically locating an optical fiber within an opening in a wall member with opposite ends of the fiber being located on opposite sides of the wall member for interconnection with other fibers, comprising:

hollow ferrule means for receiving the optical fiber therethrough;

a metal cylinder adhered onto the optical fiber located within the ferrule means;

a first quantity of a fusible material within the ferrule means for hermetically sealing the metal cylinder to an inner wall surface of the ferrule means; and a second quantity of a fusible material received about the outer periphery of the ferrule means for hermetically sealing said ferrule means within the wall member opening.

12. A device as in claim 11, in which the ferrule means includes first and second end walls opposite one another each having an opening therein of cross-sectional dimensions closely approximating that of the fiber end portions with metal cylinder located therein, the fiber end portions and adjacent outer surfaces of the end walls being faced off and polished to a condition precisely at 90 degrees to the fiber axis.

13. A device as in claim 11, in which the metal cylinder is gold.

14. A device as in claim 11, in which the fusible materials are a ceramic.

15. A device as in claim 12, in which the ferrule means includes first and second end portions in which the first and second end walls are located, and a central tubular portion, said first and second end portions being integrally joined with the central tubular portion to form the ferrule means.

16. An optical fiber feedthrough device for sealing receipt within an opening in a wall, comprising:

hollow metal tubular means;

a length of an optical fiber positioned within the tubular means with fiber end portions extending outwardly of each end of the tubular means, the two end faces of the optical fiber being faced-off and polished at 90 degrees to the fiber, said fiber end faces being substantially coextensive with the ends of the tubular means;

a metal coating molecularly secured about that portion of the optical fiber lying within the tubular means; and a quantity of a material within the tubular means for hermetically sealing the metal coating to an inner wall surface of the tubular means and positioning the optical fiber along a central axis of the tubular means.

* * * * *